United States Patent
Jung et al.

(10) Patent No.: US 12,058,055 B2
(45) Date of Patent: Aug. 6, 2024

(54) SYSTEM AND METHOD FOR ENSURING CONTINUITY OF PROXY-BASED SERVICE

(71) Applicant: STCLab. Co., Ltd., Seoul (KR)

(72) Inventors: Hoon Ho Jung, Bucheon-si (KR); Hyung Joon Park, Seoul (KR)

(73) Assignee: STCLab. Co., Ltd., Seoul (KR)

( * ) Notice: Subject to any disclaimer, the term of this patent is extended or adjusted under 35 U.S.C. 154(b) by 0 days.

(21) Appl. No.: 18/399,259

(22) Filed: Dec. 28, 2023

(65) Prior Publication Data

US 2024/0223509 A1     Jul. 4, 2024

(30) Foreign Application Priority Data

Dec. 29, 2022 (KR) .................. 10-2022-0189788

(51) Int. Cl.
*H04L 47/625* (2022.01)
*H04L 9/08* (2006.01)
*H04L 47/62* (2022.01)

(52) U.S. Cl.
CPC ........ *H04L 47/6255* (2013.01); *H04L 9/0861* (2013.01); *H04L 47/6225* (2013.01)

(58) Field of Classification Search
CPC .......................... H04L 47/6255; H04L 9/0861
See application file for complete search history.

(56) References Cited

U.S. PATENT DOCUMENTS

| | | | | |
|---|---|---|---|---|
| 8,121,874 B1* | 2/2012 | Guheen | ............... | G06Q 10/087 705/28 |
| 9,225,661 B1* | 12/2015 | Yang | ................. | H04L 67/1001 |
| 9,961,066 B1* | 5/2018 | Kitchen | ............. | H04L 63/0807 |
| 10,979,533 B2* | 4/2021 | Shribman | ............... | H04L 67/06 |
| 11,102,139 B1* | 8/2021 | Deng | .................... | H04L 67/562 |
| 11,201,939 B1* | 12/2021 | Mokashi | ............... | H04L 67/568 |
| 11,503,104 B1* | 11/2022 | Thomas | .................. | H04L 67/60 |
| 2008/0008202 A1* | 1/2008 | Terrell | .................. | H04L 47/527 370/401 |
| 2012/0209945 A1* | 8/2012 | Chandrasekhar | ......... | H04L 9/40 709/217 |
| 2013/0326067 A1* | 12/2013 | Smith, II | ............. | H04L 67/101 709/226 |
| 2016/0234686 A1* | 8/2016 | Bone | ....................... | H04W 8/04 |
| 2016/0337426 A1* | 11/2016 | Shribman | ............. | H04L 65/612 |
| 2018/0041336 A1* | 2/2018 | Keshava | ............... | H04L 9/0891 |

(Continued)

FOREIGN PATENT DOCUMENTS

| | | | | | |
|---|---|---|---|---|---|
| CA | 2388624 C | * | 7/2011 | ............... | G06F 8/20 |
| CN | 1183841 A | * | 6/1998 | ............. | G06F 21/00 |

(Continued)

*Primary Examiner* — Chi H Pham
*Assistant Examiner* — Vladislav Y Agureyev
(74) *Attorney, Agent, or Firm* — Studebaker & Brackett PC

(57) ABSTRACT

Disclosed is a system for ensuring the continuity of a proxy-based service, and a method thereof. The system includes a target server that processes a queue of access requests received from a plurality of client devices and processes the queue until a first time point when the waiting amount of access request exceeds a predetermined first threshold, a queue management server that processes the queue from the first time point until a second time point when the waiting amount exceeds a predetermined second threshold, and a mirror server that processes the queue from the second time point.

10 Claims, 4 Drawing Sheets

(56) References Cited

U.S. PATENT DOCUMENTS

| | | | |
|---|---|---|---|
| 2018/0048674 A1* | 2/2018 | Black | H04W 12/041 |
| 2019/0089809 A1* | 3/2019 | Theebaprakasam | G06F 11/3006 |
| 2019/0104057 A1* | 4/2019 | Goel | H04L 45/24 |
| 2019/0158428 A1* | 5/2019 | Gray | H04L 47/2483 |
| 2019/0312857 A1* | 10/2019 | Lander | G06F 9/5072 |
| 2021/0120101 A1* | 4/2021 | Alexander | H04L 67/131 |
| 2021/0152386 A1* | 5/2021 | Chari | H04L 41/40 |
| 2021/0209614 A1* | 7/2021 | Bakalis | H04L 9/0827 |
| 2022/0124560 A1* | 4/2022 | Yeh | H04L 41/5025 |
| 2022/0400096 A1* | 12/2022 | Freed | H04L 67/56 |
| 2023/0096468 A1* | 3/2023 | Ong | H04L 47/2441 370/235 |
| 2023/0185957 A1* | 6/2023 | Brown | G06F 16/23 726/26 |
| 2023/0231811 A1* | 7/2023 | Dalal | G06F 13/4022 710/308 |
| 2023/0336794 A1* | 10/2023 | Liu | H04N 21/2407 |
| 2024/0056368 A1* | 2/2024 | Banaji | H04L 41/5074 |

FOREIGN PATENT DOCUMENTS

| | | | | |
|---|---|---|---|---|
| CN | 108322472 B | * | 6/2019 | ......... H04L 63/0281 |
| CN | 113766019 A | * | 12/2021 | |
| CN | 114172698 A | * | 3/2022 | |
| EP | 3678348 A1 | * | 7/2020 | ......... H04L 63/0227 |
| JP | 3627005 B2 | * | 3/2005 | ......... G06F 16/9574 |
| KR | 10-1654266 B1 | | 9/2016 | |

* cited by examiner

SYSTEM AND METHOD FOR ENSURING CONTINUITY OF PROXY-BASED SERVICE

CROSS-REFERENCE TO RELATED APPLICATIONS

The present application claims the benefit of priority to Korean Patent Application No. 10-2022-0189788, filed on Dec. 29, 2022, the entire disclosure of which is hereby incorporated by reference.

BACKGROUND

Embodiments of the present disclosure described herein relate to a system for ensuring the continuity of a proxy-based service, and a method thereof.

As the number of concurrent users of a service server that provides a content service such as course registrations, concert reservations, and purchase events increases, the response speed of the service server providing the content service may decrease or the service may be interrupted.

A system may be composed of a WEB that provides a web page composed of a hypertext markup language (HTML), a web application server (WAS) that processes application program services for request messages delivered from the WEB, and a database that stores data capable of being provided in response to query statements.

In the above-mentioned system, when the number of concurrent users is overwhelming, a WEB response time may be delayed due to insufficient network bandwidth.

SUMMARY

Embodiments of the present disclosure provide a system for ensuring the continuity of a proxy-based service, and a method thereof.

Problems to be solved by the present disclosure are not limited to the problems mentioned above, and other problems not mentioned will be clearly understood by those skilled in the art from the following description.

According to an embodiment, a system for ensuring continuity of a proxy-based service includes a target server that processes a queue of an access request until a first time point when a waiting amount of the access request received from a plurality of client devices exceeds a predetermined first threshold value, a queue management server that processes the queue from the first time point to a second time point when the waiting amount exceeds a predetermined second threshold value, and a mirror server that processes the queue from the second time point. The first threshold value is a threshold value of processing capacity of the target server, and the second threshold value is a threshold value of processing capacity of the queue management server. A checker included in the target server verifies all access requests included in the queue depending on order information assigned to each of access requests managed by each of the target server, the queue management server, and the mirror server, through a queue manager included in each of the target server, the queue management server, and the mirror server, not a queue processing order between the target server, the queue management server, and the mirror server. The mirror server includes components the same as the queue management server and internally performs queue management.

In this case, a key generated by a first encryptor included in the queue management server may be issued to an access request managed by each of the target server and the queue management server. A key generated by a second encryptor included in the mirror server may be issued to an access request managed by the mirror server. The first encryptor and the second encryptor may be synchronized with each other.

Moreover, the first encryptor and the second encryptor may generate the key by using the same public key. The public key may be changed at a predetermined interval.

Furthermore, the order information may be sequentially assigned to access requests, which are received until the first time point, through a first queue manager included in the target server. The order information may be sequentially assigned to access requests, which are received from the first time point, through a second queue manager included in the queue management server, and the order information may be sequentially assigned starting from an order following an order corresponding to order information last assigned through the first queue manager. The order information may be sequentially assigned to access requests, which are received from the second time point, through a third queue manager included in the mirror server, and the order information may be sequentially assigned starting from an order following an order corresponding to order information last assigned through the second queue manager.

In this case, when the waiting amount falls within the first threshold value again after the waiting amount exceeds the first threshold value, the first queue manager may sequentially assign the order information starting from an order following an order corresponding to last assigned order information, based on order information assigned by at least one of the first queue manager, the second queue manager, and the third queue manager.

According to an embodiment, a method performed by a system including a target server, a queue management server, and a mirror server includes processing, by a target server, a queue of an access request until a first time point when a waiting amount of the access request received from a plurality of client devices exceeds a predetermined first threshold value, processing, by a queue management server, the queue from the first time point to a second time point when the waiting amount exceeds a predetermined second threshold value, and processing, by a mirror server, the queue from the second time point. The first threshold value is a threshold value of processing capacity of the target server, and the second threshold value is a threshold value of processing capacity of the queue management server. Verification is performed by a checker included in the target server on all access requests included in the queue depending on order information assigned to each of access requests managed by each of the target server, the queue management server, and the mirror server, through a queue manager included in each of the target server, the queue management server, and the mirror server, not a queue processing order between the target server, the queue management server, and the mirror server. The mirror server includes components the same as the queue management server and internally performs queue management.

Besides, a computer program stored in a computer-readable recording medium for executing a method to implement the present disclosure may be further provided.

In addition, a computer-readable recording medium for recording a computer program for performing the method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
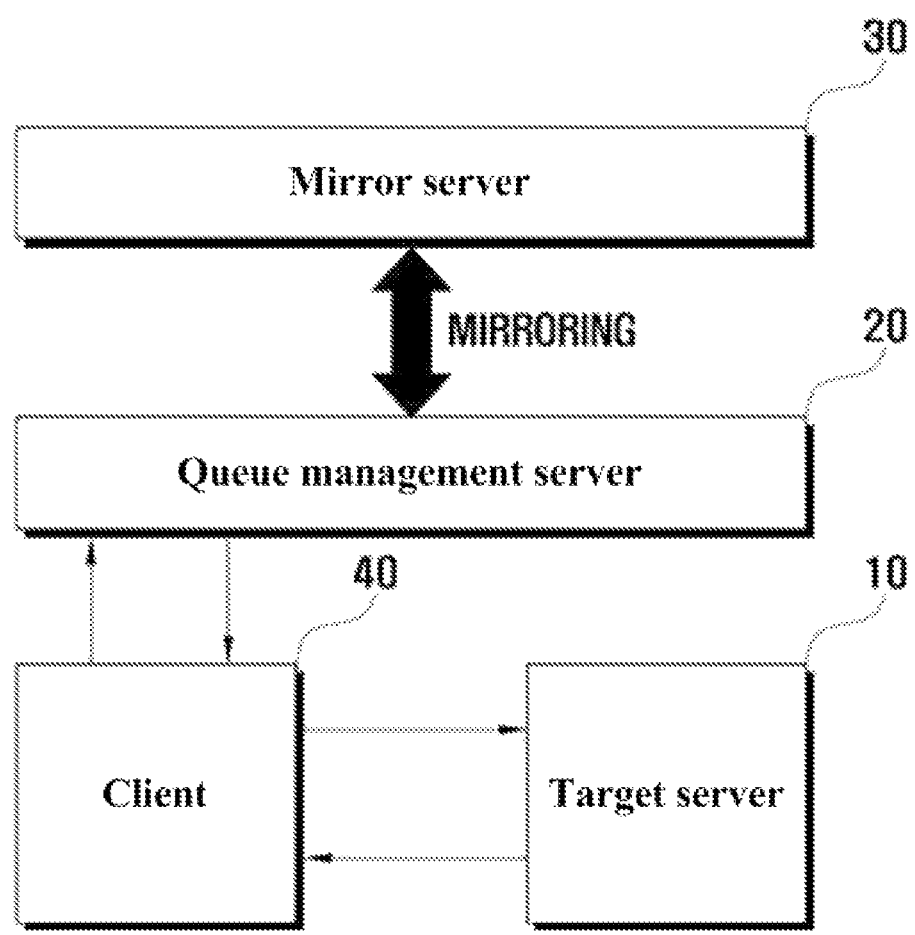
FIG. 1 is a diagram schematically showing a system for ensuring the continuity of a proxy-based service, according to an embodiment of the present disclosure.

The same reference numerals denote the same elements throughout the present disclosure. The present disclosure does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

In this specification, a 'server' includes all various devices capable of providing results to a user by performing arithmetic processing. For example, the server according to an embodiment of the present disclosure may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

A conventional proxy-based service is implemented in such a way that a proxy server is located between a client device and a service server to relay the client device's request to the service server and the service server's response to the client device. In this case, when the number of requests exceeds the capacity of the service server at the same time, the proxy server may fail and the service may be interrupted. Accordingly, according to an embodiment of the present disclosure, a method of continuously providing a proxy-based service without interruption may be described with reference to FIGS. 1 to 4.

FIG. 1 is a diagram schematically showing a system for ensuring the continuity of a proxy-based service, according to an embodiment of the present disclosure.

Referring to FIG. 1, a system according to an embodiment of the present disclosure may include a target server 10, a queue management server 20, a mirror server 30, and a client device 40. However, in some embodiments, the system may include fewer or more components than the components illustrated in FIG. 1.

The target server 10 may provide a web service to a user through a website or web page. The web service may include, but is not limited to, a product sales service, a course registration service, and a performance reservation service.

The target server 10 is a service server, which allocates and manages resources to provide a web service in a cloud environment (AWS), and is operated by cloud operators such as CSP and MSP.

Although not shown in FIG. 1, the target server 10 may include a web server, a web application server (hereinafter referred to as "WAS"), and a database DB. In this case, the database may also be referred to as a "database management system (DBMS)".

A web server may refer to a server that mainly processes requests from a client device such as a web browser or a web crawler based on HTTP protocol. When the web server receives an HTTP request, the web server may reply with an HTTP response.

For example, the web server may receive a file path name and may return static file content (html, jpeg, css, or the like) that matches the path.

The web server may deliver a request for providing dynamic content to the WAS, may receive the processed result from the WAS, and may deliver the result to the client device.

The WAS refers to an application server using HTTP, and may include a container that makes dynamic data available to a web server specialized in processing static HTTP data.

The WAS may be an application server for providing dynamic content that requires database inquiry or various logic processing. The WAS may be middleware (a software engine) that executes applications on computers or devices through HTTP. The WAS may also be named a web container or servlet container. In this case, the container may refer to software capable of executing JSP and Servlet.

The WAS may be applied in a distributed environment for processing functions such as distributed transactions, security, messaging, and thread processing.

In detail, the WAS may implement program execution environments, database access functions, and multiple transaction management functions. The transaction may refer to a logical unit of work.

The WAS may receive the corresponding data from the database at the request of a user, may generate results in real time according to business logic, and may provide the results. The WAS may include a plurality of web application servers. The number of web application servers applied to each queue management server 20 may be different.

The database may refer to a structure that stores and manages data. In this case, the database may reply the corresponding data at the request of the WAS.

The queue management server 20 may be placed between the target server 10 and the client device 40 to manage an entry of the client device 40 into the target server 10.

The queue management server 20 may perform a procedure of entry permission management for the client device 40 that requests an entry into the target server 10.

The entry permission management refers to normal standby management for an entry into the target server 10, and may refer to a procedure for managing the resource or status of the target server 10 that provides a content service by controlling the entry based on the number of allowable entries (processing capacity).

In this case, the number of allowable entries may refer to the number of users who are issued a key of the queue management server 20 and are capable of simultaneously entering a specific transaction (e.g., a login button, a purchase button, a payment button, or the like) of the target server 10. At this time, the number of users may actually mean the number of client devices 40 capable of entering the target server 10.

For example, when 50 people are allowed to enter the target server 10 that provides the product purchase service, and 55 people simultaneously select a purchase button for the same product, the queue management server 20 allows 50 people to enter the target server 10 at the same time, but may process 5 people to be placed in the queue.

In other words, conventionally, the queue management server 20 instead manages queues incapable of being processed by the target server 10. As the target server 10 sequentially performs the processing of access requests, an entry into the target server 10 may be sequentially allowed with respect to the access requests, which are placed in the queue of the queue management server 20.

However, when there is a large number of simultaneous access requests to the target server 10 (i.e., when access requests occur at the same time that the queue management server 20 is incapable of handling), the service may be interrupted due to an overload condition. Accordingly, according to an embodiment of the present disclosure, the mirror server 30 manages the queue for access requests, of which the number exceeds the processing capacity of the queue management server 20, by using the mirror server 30 for mirroring the queue management server 20.

The client device 40 may be a user's terminal that uses the web service provided by the target server 10. There may be the at least one or more client devices 40. For example, the user may purchase a specific product, may sign up for classes, or may reserve tickets for specific performances through his/her terminal.

The client device 40 transmits a request for access to a specific website or a specific web page within the specific website to the queue management server 20.

In the meantime, the client device 40 receives waiting information from the queue management server 20. When access is permitted by the queue management server 20, the client device 40 accesses a specific website or a specific web page within the specific website. This makes the web service available to the user.

The client device 40 may be a computer, an ultra-mobile PC (UMPC), a workstation, a net-book, personal digital assistants (PDA), a portable computer, a web tablet, a wireless phone, a mobile phone, a smart phone, a pad, a smart watch, a wearable terminal, an e-book, a portable multimedia player (PMP), a portable game console, a navigation device, a black box or digital camera, other mobile communication terminals, or the like, on which a user is capable of installing and executing a plurality of desired application programs (i.e., applications). In other words, the client device 40 may be provided in various forms and is not limited to only the form of the terminal shown in FIG. 1.

Figure 2:
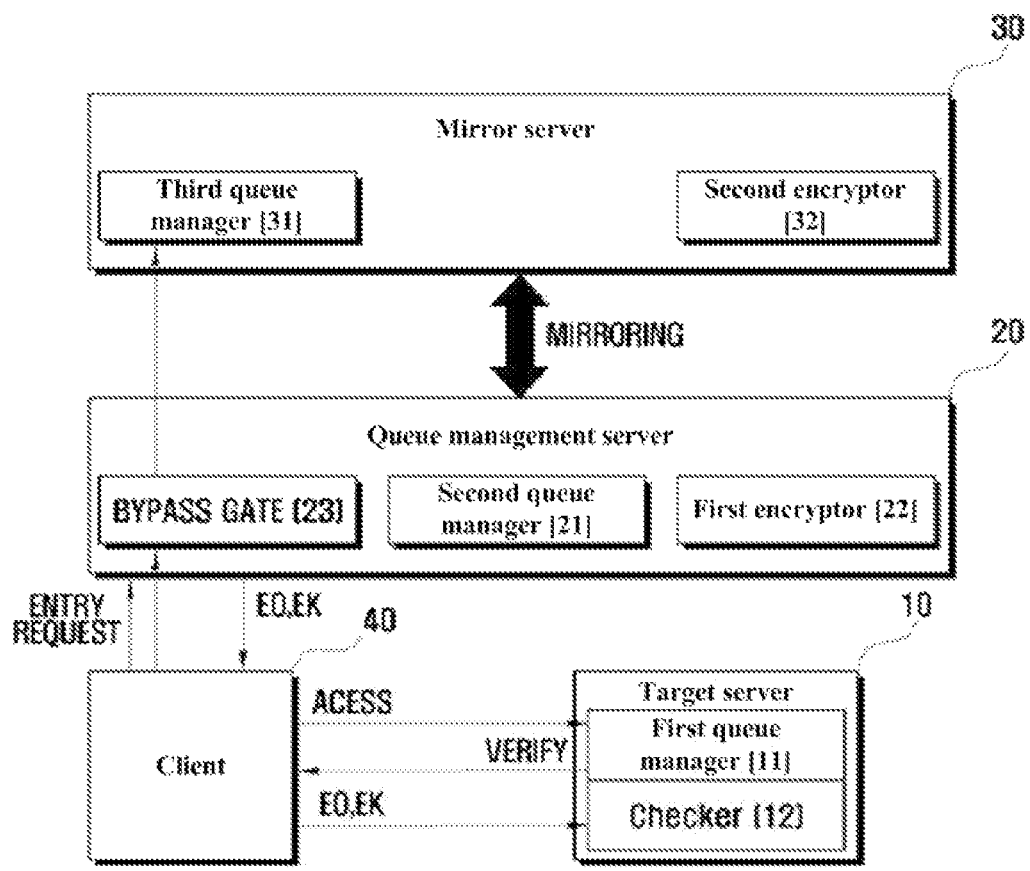
FIG. 2 is a block diagram for specifically describing components of a system, according to an embodiment of the present disclosure.

FIG. 2 is a block diagram for specifically describing components of a system, according to an embodiment of the present disclosure.

The target server 10 may include a first queue manager 11 and a checker 12. However, in some embodiments, the target server 10 may include fewer or more components than the components illustrated in FIG. 2.

The first queue manager 11 may manage the queue of access requests for entering the target server 10. In detail, the first queue manager 11 may place the access requests in the queue by assigning order information in the order in which the access requests are entered. Furthermore, the first queue manager 11 may assign order information to access requests in order based on the order information of the queue of at least one of the queue management server 20 and the mirror server 30, and may place the access requests in the queue. To this end, the first queue manager 11, a second queue manager 21, and a third queue manager 31 may be synchronized with each other.

As described above, because the number of allowed entries (hereinafter, referred to as a "first threshold value") is set, the target server 10 may directly perform queue management on only access requests of which the number corresponds to the first threshold value. For example, when 100 access requests occur at the same time and the first threshold value is 50, the target server 10 may manage the queue by sequentially assigning order information to only 50 out of the The checker 12 may sequentially verify access requests, which wait in a queue of at least one of the target server 10, the queue management server 20, and the mirror server 30. In particular, the checker 12 may verify that access is normal, by checking a key issued to each access request. A response to the verified access request from the target server 10 may be transmitted to the client device 40.

The queue management server 20 may include a second queue manager 21, a first encryptor 22, and a bypass gate 23. However, in some embodiments, the queue management server 20 may include fewer or more components than the components illustrated in FIG. 2.

The second queue manager 21 may manage the queue of access requests that fail to enter the target server 10. As described above, when 100 access requests occur at the same time and the first threshold value is 50, the target server 10 may only manage queues for 50 access requests out of 100 access requests. Moreover, the 51st access request and subsequent access requests may be managed by the second queue manager 21.

In detail, the second queue manager 21 may assign order information to access requests in order based on the order information of the queue of at least one of the target server 10 and the mirror server 30, and may place the access requests in the queue. To this end, the first queue manager 11, a second queue manager 21, and a third queue manager 31 may be synchronized with each other. That is, through the synchronization, the second queue manager 21 may recognize that the last access request in the queue of the target server 10 has an order of No. 50, and may assign order information of the first access request in the queue, which is managed by itself, as No. 51.

As described above, because processing capacity (hereinafter, referred to as a "second threshold value") is set, the queue management server 20 may perform queue management on only access requests of which the number corresponds to the second threshold value. For example, when 100 access requests occur at the same time, the first threshold value is 50, and the second threshold value is 30, the target server 10 manages the queue by assigning order information (numbers 1 to 50) to only 50 access requests out of 100 access requests, and the queue management server 20 manages the queue by assigning order information (No. 51 to No. 80) to only the next 30 access requests.

The first encryptor 22 may perform key issuance and key retrieval functions for an access request managed by the target server 10 and the queue management server 20. In detail, the first encryptor 22 may issue a key only for access requests corresponding to the sum of the first threshold value of the target server 10 and the second threshold value of the queue management server 20. Afterward, when an access request for which a key is issued by the first encryptor 22 is completely processed (verified and executed), the first encryptor 22 may retrieve the key issued for the access request.

The bypass gate 23 may serve as a path for delivering, to the mirror server 30, access requests, which the queue management server 20 is incapable of processing, from among access requests that failed to enter the target server 10. For example, when 100 access requests occur at the same time, the first threshold value is 50, and the second threshold value is 30, the target server 10 may manage the queue for 50 access requests out of 100 access requests, and the queue management server 20 may manage the queue for 30 access requests out of the remaining 50 access requests. Besides, the remaining 20 may be delivered to the mirror server 30 through the bypass gate 23 and then may be managed by the mirror server 30.

The mirror server 30 may include a third queue manager 31 and a second encryptor 32. However, in some embodiments, the mirror server 30 may include fewer or more components than the components illustrated in FIG. 2.

As described above, the third queue manager 31 may manage the queue of access requests that fail to be processed by the queue management server 20.

In detail, the third queue manager 21 may assign order information to access requests in order based on the order information of the queue of at least one of the target server 10 and the queue management server 20, and may place the access requests in the queue. To this end, the first queue manager 11, the second queue manager 21, and the third queue manager 31 may be synchronized with each other. That is, through the synchronization, the third queue manager 31 may recognize that the last access request in the queue of the queue management server 20 has an order of No. 80, and may assign order information of the first access request in the queue, which is managed by itself, as No. 81.

The second encryptor 32 may perform key issuance and key retrieval functions for an access request managed by the mirror server 30. In detail, the second encryptor 32 may issue a key only for access requests corresponding to the processing capacity of the mirror server 30. Afterward, when an access request for which a key is issued by the second encryptor 32 is completely processed (verified and executed), the second encryptor 32 may retrieve the key issued for the access request.

Hereinafter, a method in which the target server 10, the queue management server 20, and the mirror server 30 sequentially perform queue management depending on a threshold value of processing capacity will be described with reference to FIGS. 3 and 4.

Figure 3:
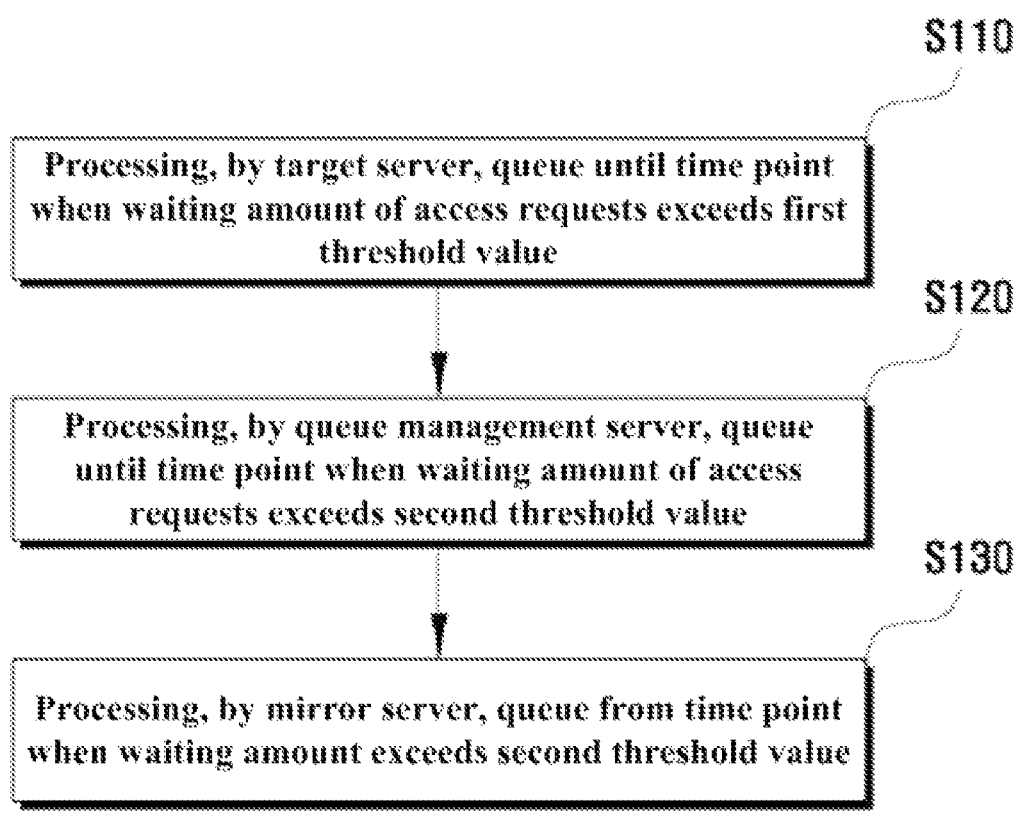
FIG. 3 is a flowchart of a method of ensuring the continuity of a proxy-based service, according to an embodiment of the present disclosure.

FIG. 3 is a flowchart of a method of ensuring the continuity of a proxy-based service, according to an embodiment of the present disclosure. FIG. 4 is an example diagram for describing that order information is assigned depending on processing access requests, according to an embodiment of the present disclosure.

A method according to an embodiment of the present disclosure may be performed by a system including the target server 10, the queue management server 20, and the mirror server 30, but may not be limited thereto. The method according to an embodiment of the present disclosure may be performed by at least one server among the target server 10, the queue management server 20, and the mirror server 30.

Referring to FIG. 3, the target server 10 may process a queue of each access request received from a plurality of client devices, and may process the queue until the waiting amount of the access request exceeds a predetermined first threshold value (S110).

Access requests from the plurality of the client devices 40 may be transmitted to the queue management server 20. Moreover, order information may be assigned to the access requests in the order in which they are transmitted to the queue management server 20. In this case, order information may be assigned by one of the first queue manager 11 included in the target server 10, the second queue manager 21 included in the queue management server 20, and the third queue manager 31 included in the mirror server 30. This will be described later.

The queue management server 20 may determine whether the client device enters the target server, depending on the status of the target server 10 (whether queue processing capacity remains). In other words, the queue management server 20 may allow entry of an access request until a threshold value (the first threshold value) of the queue processing capacity of the target server 10 is exceeded.

The target server 10 may sequentially assign order information to access requests, which are received before the first threshold value is exceeded, through the first queue manager 11 and may perform queue management.

For example, when the first threshold value is 50, the first queue manager 11 may sequentially assign order information from No. 1 to No. 50 for access requests included in the queue.

When the waiting amount exceeds the first threshold value, the queue management server 20 processes the queue instead of the target server 10, and may process the queue until the waiting amount exceeds the predetermined second threshold value (S120).

The queue management server 20 may determine whether the client device enters the target server, depending on the status of the target server 10 (whether queue processing capacity remains). In other words, when the threshold value (the first threshold value) of the queue processing capacity of the target server 10 is exceeded, the queue management server 20 may not allow entry to the target server for access requests from the corresponding time point.

The queue management server 20 may sequentially assign order information through the second queue manager 21 and may perform queue management on access requests, which are received before the threshold value (the second threshold value) of the queue processing capacity of the queue management server 20 is exceeded, from among access requests (an access request not allowed) received from a point in time when the first threshold value is exceeded. Furthermore, when assigning order information, the second queue manager 21 may sequentially assign order information starting from the next order corresponding to the order information last assigned through the first queue manager 11.

For example, when order information of No. 50 is assigned to the last access request in the queue of the target server 10, the second queue manager 21 may assign order information starting from No. 51.

When the waiting amount exceeds the second threshold value, the mirror server 30 may process the queue instead of the queue management server 20 (S130). Here, the mirror server 30 may include the same components as the queue management server 20 and may perform queue management.

Access requests (access requests not processed by a queue management device) received from a time point when the second threshold value is exceeded may be delivered to the mirror server 30 through the bypass gate 23 of the queue management server 20. Afterward, the mirror server 30 may perform queue management by sequentially assigning order information through the third queue manager 31.

Furthermore, when assigning order information, the third queue manager 31 may sequentially assign order information starting from the next order corresponding to the order information last assigned through the second queue manager 21.

For example, when order information of No. 80 is assigned to the last access request in the queue of the queue management server 20, the third queue manager 31 may assign order information starting from No. 81.

In the meantime, the target server 10 may sequentially perform key-based verification on all access requests included in the queue managed by the target server 10, the queue managed by the queue management server 20, and the queue managed by the mirror server 30, through the checker 12.

In other words, apart from individually managing queues in a plurality of servers depending on processing capacity, access requests may be verified sequentially based on order information on the target server 10.

In this case, a key generated by the first encryptor 22 included in the queue management server 20 may be issued to access requests included in the queue managed by the target server 10 and the queue managed by the queue management server 20. In addition, a key generated by the second encryptor 32 included in the mirror server 30 may be issued to access requests included in the queue managed by the mirror server 30.

Here, the first encryptor 22 and the second encryptor 32 may be synchronized with each other.

Moreover, the first encryptor 22 and the second encryptor 32 may generate keys using the same public key. In this case, the public key used to generate a key may be changed at predetermined intervals. In an embodiment, the public key may change in units of time or access request.

That is, the first encryptor 22 and the second encryptor 32 are synchronized, and thus the first encryptor 22 or the second encryptor 32 may generate keys with the same public key even when the public key is created or changed in either the first encryptor 22 or the second encryptor 32.

The key issued to each access request may be used for verification on the target server 10. The target server 10 may verify that access is normal, by checking a key issued to each access request through the checker 12. Moreover, the access request that is verified in this way may be executed and provided to the screen of the client device 40.

As the access request is completely processed, the waiting amount of access requests waiting in the queue changes in real time.

The access requests may be processed sequentially depending on order information. Referring to FIG. 4, order information of No. 1, No. 2, and No. 3 may be assigned by the first queue manager 11 to access requests before a time point t1 when the waiting amount exceeds the first threshold value; order information No. 4 and No. 5 may be assigned by the second queue manager 21 to access requests from the time point t1 until a time point t2 when the waiting amount exceeds the second threshold value; and, order information of No. 6 may be assigned by the third queue manager 31 to access requests from the time point t2.

A total of six access requests may be processed sequentially through verification.

Figure 4:
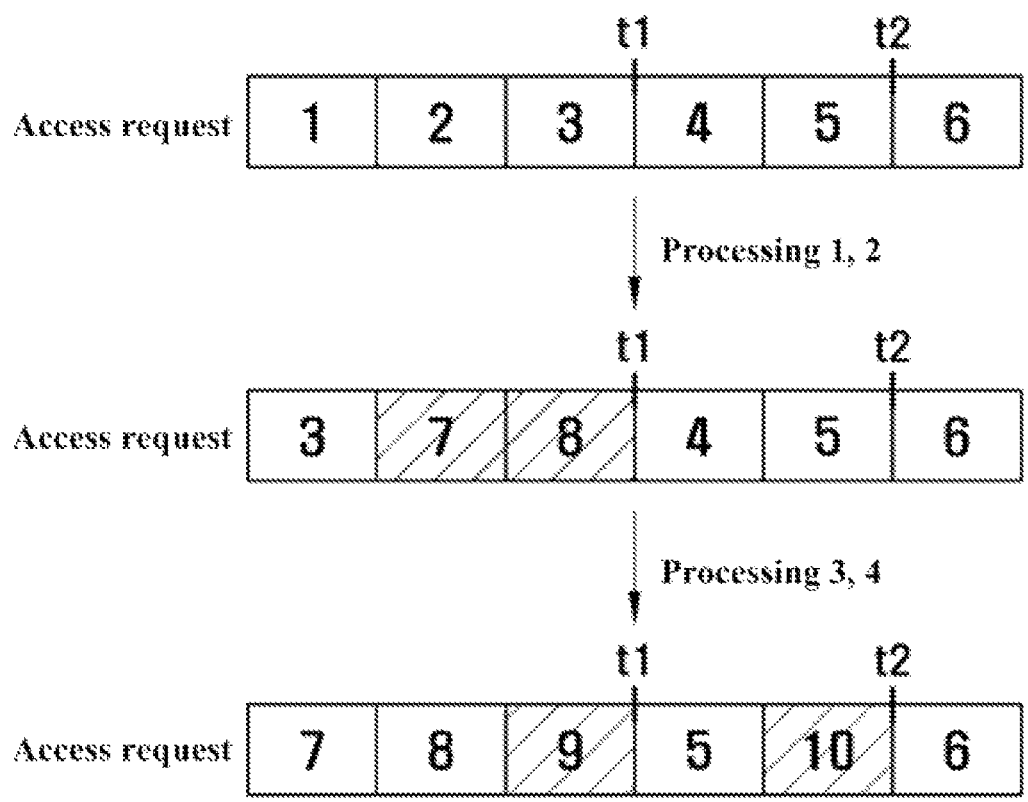
FIG. 4 is an example diagram for describing that order information is assigned depending on processing access requests, according to an embodiment of the present disclosure.

As shown in FIG. 4, when the waiting amount returns within the first threshold value (the processing capacity is maintained as 2) as the target server 10 processes access request 1 and access request 2, the first queue manager 11 may assign order information to access requests thus newly received.

In this case, the first queue manager 11 may sequentially assign order information starting from the next order corresponding to the last assigned order information, based on order information assigned by at least one of the first queue manager 11, the second queue manager 21, and the third queue manager 31.

That is, as shown in FIG. 4, the first queue manager 11 may identify that No. 6 is last assigned by the third queue manager 31, and the first queue manager 11 may assign order information of No. 7 and No. 8 to two access requests that are newly received, respectively.

Afterward, when the waiting amount returns within the first threshold value and the second threshold value (each processing capacity is maintained as 1) as the target server 10 processes access request 3 and access request 4, each of the first queue manager 11 and the second queue manager 21 may assign order information to access requests thus newly received.

In this case, the first queue manager 11 and the second queue manager 21 may sequentially assign order information starting from the next order corresponding to the last assigned order information, based on order information assigned by at least one of the first queue manager 11, the second queue manager 21, and the third queue manager 31.

In detail, because the queue management server 20 performs queue management after the first threshold value of the target server 10 is exceeded, the first queue manager 11 may first assign order information to a new access request based on the last order information until the first threshold value is exceeded. Afterward, the second queue manager 21 may assign order information to a new access request based on the last order information.

As shown in FIG. 4, the first queue manager 11 may identify that No. 8 is last assigned by the first queue manager 11, and the first queue manager 11 may assign order information of No. 9 to one access request that is newly received. As a result, the first threshold value has been exceeded again, and thus the second queue manager 21 performs a queue management operation. The second queue manager 21 may assign No. 10, which is the next number 9 last assigned by the first queue manager 11, to one newly received access request.

FIG. 3 illustrates that steps are performed sequentially. However, this is merely illustrative of the technical idea of the present disclosure. Those skilled in the art to which an embodiment of the present disclosure belongs may apply various modifications and variations by changing and performing the order illustrated in FIG. 3 or performing steps in parallel without departing from the essential characteristics of an embodiment of the present disclosure. The embodiment in FIG. 3 is not limited to a time-series order.

In the meantime, in the above description, steps described in FIG. 3 may be further divided into additional operations or may be combined into fewer operations, according to an embodiment of the present disclosure. In addition, some steps may be omitted as necessary, and the order between steps may be changed.

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the present disclosure belongs will understand that the present disclosure may be practiced in forms other than the disclosed embodiments without altering the technical ideas or essential features of the present disclosure. The disclosed embodiments are examples and should not be construed as limited thereto.

According to the above-mentioned problem solving means of the present disclosure, when the waiting amount of access requests exceeds the processing capacity of a front server, a service may be provided without interruption as an back-end server processes the queue instead (i.e., as the queue is processed in the order of a target server→a queue management server→a mirror server).

Effects of the present disclosure are not limited to the effects mentioned above, and other effects not mentioned will be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A system for ensuring continuity of a proxy-based service, the system comprising:
    a target server configured to process a queue of an access request until a first time point when a waiting amount of the access request received from a plurality of client devices exceeds a predetermined first threshold value;
    a queue management server configured to process the queue from the first time point to a second time point when the waiting amount exceeds a predetermined second threshold value; and
    a mirror server configured to process the queue from the second time point,
    wherein the first threshold value is a threshold value of processing capacity of the target server, and the second threshold value is a threshold value of processing capacity of the queue management server,
    wherein a checker included in the target server verifies all access requests included in the queue depending on order information assigned to each of access requests managed by each of the target server, the queue management server, and the mirror server, through a queue manager included in each of the target server, the queue management server, and the mirror server, not a queue processing order between the target server, the queue management server, and the mirror server, and
    wherein the mirror server includes components the same as the queue management server and internally performs queue management.

2. The system of claim 1, wherein a key generated by a first encryptor included in the queue management server is issued to an access request managed by each of the target server and the queue management server,
    wherein a key generated by a second encryptor included in the mirror server is issued to an access request managed by the mirror server, and
    wherein the first encryptor and the second encryptor are synchronized with each other.

3. The system of claim 2, wherein the first encryptor and the second encryptor generate the key by using the same public key, and
    wherein the public key is changed at a predetermined interval.

4. The system of claim 1, wherein the order information is sequentially assigned to access requests, which are received until the first time point, through a first queue manager included in the target server,
    wherein the order information is sequentially assigned to access requests, which are received from the first time point, through a second queue manager included in the queue management server, and the order information is sequentially assigned starting from an order following an order corresponding to order information last assigned through the first queue manager, and
    wherein the order information is sequentially assigned to access requests, which are received from the second time point, through a third queue manager included in the mirror server, and the order information is sequentially assigned starting from an order following an order corresponding to order information last assigned through the second queue manager.

5. The system of claim 4, wherein, when the waiting amount falls within the first threshold value again after the waiting amount exceeds the first threshold value, the first queue manager sequentially assigns the order information starting from an order following an order corresponding to last assigned order information, based on order information assigned by at least one of the first queue manager, the second queue manager, and the third queue manager.

6. A method performed by a system including a target server, a queue management server, and a mirror server, the method comprising:
processing, by a target server, a queue of an access request until a first time point when a waiting amount of the access request received from a plurality of client devices exceeds a predetermined first threshold value;
processing, by a queue management server, the queue from the first time point to a second time point when the waiting amount exceeds a predetermined second threshold value; and
processing, by a mirror server, the queue from the second time point,
wherein the first threshold value is a threshold value of processing capacity of the target server, and the second threshold value is a threshold value of processing capacity of the queue management server,
wherein verification is performed by a checker included in the target server on all access requests included in the queue depending on order information assigned to each of access requests managed by each of the target server, the queue management server, and the mirror server, through a queue manager included in each of the target server, the queue management server, and the mirror server, not a queue processing order between the target server, the queue management server, and the mirror server, and
wherein the mirror server includes components the same as the queue management server and internally performs queue management.

7. The method of claim 6, wherein a key generated by a first encryptor included in the queue management server is issued to an access request managed by each of the target server and the queue management server,
wherein a key generated by a second encryptor included in the mirror server is issued to an access request managed by the mirror server, and
wherein the first encryptor and the second encryptor are synchronized with each other.

8. The method of claim 7, wherein the first encryptor and the second encryptor generate the key by using the same public key, and
wherein the public key is changed at a predetermined interval.

9. The method of claim 6, wherein the order information is sequentially assigned to access requests, which are received until the first time point, through a first queue manager included in the target server,
wherein the order information is sequentially assigned to access requests, which are received from the first time point, through a second queue manager included in the queue management server, and the order information is sequentially assigned starting from an order following an order corresponding to order information last assigned through the first queue manager, and
wherein the order information is sequentially assigned to access requests, which are received from the second time point, through a third queue manager included in the mirror server, and the order information is sequentially assigned starting from an order following an order corresponding to order information last assigned through the second queue manager.

10. The method of claim 9, wherein, when the waiting amount falls within the first threshold value again after the waiting amount exceeds the first threshold value, the first queue manager sequentially assigns the order information starting from an order following an order corresponding to last assigned order information, based on order information assigned by at least one of the first queue manager, the second queue manager, and the third queue manager.

* * * * *